July 15, 1941.  M. G. LEONARD  2,249,012
PROTECTIVE DEVICE FOR ELECTRICAL APPARATUS
Filed Sept. 3, 1938  3 Sheets-Sheet 1

WITNESSES:
E. F. Oberheim
Nw. C. Groome

INVENTOR
Merrill G. Leonard.
BY
Ezra W. Savage
ATTORNEY

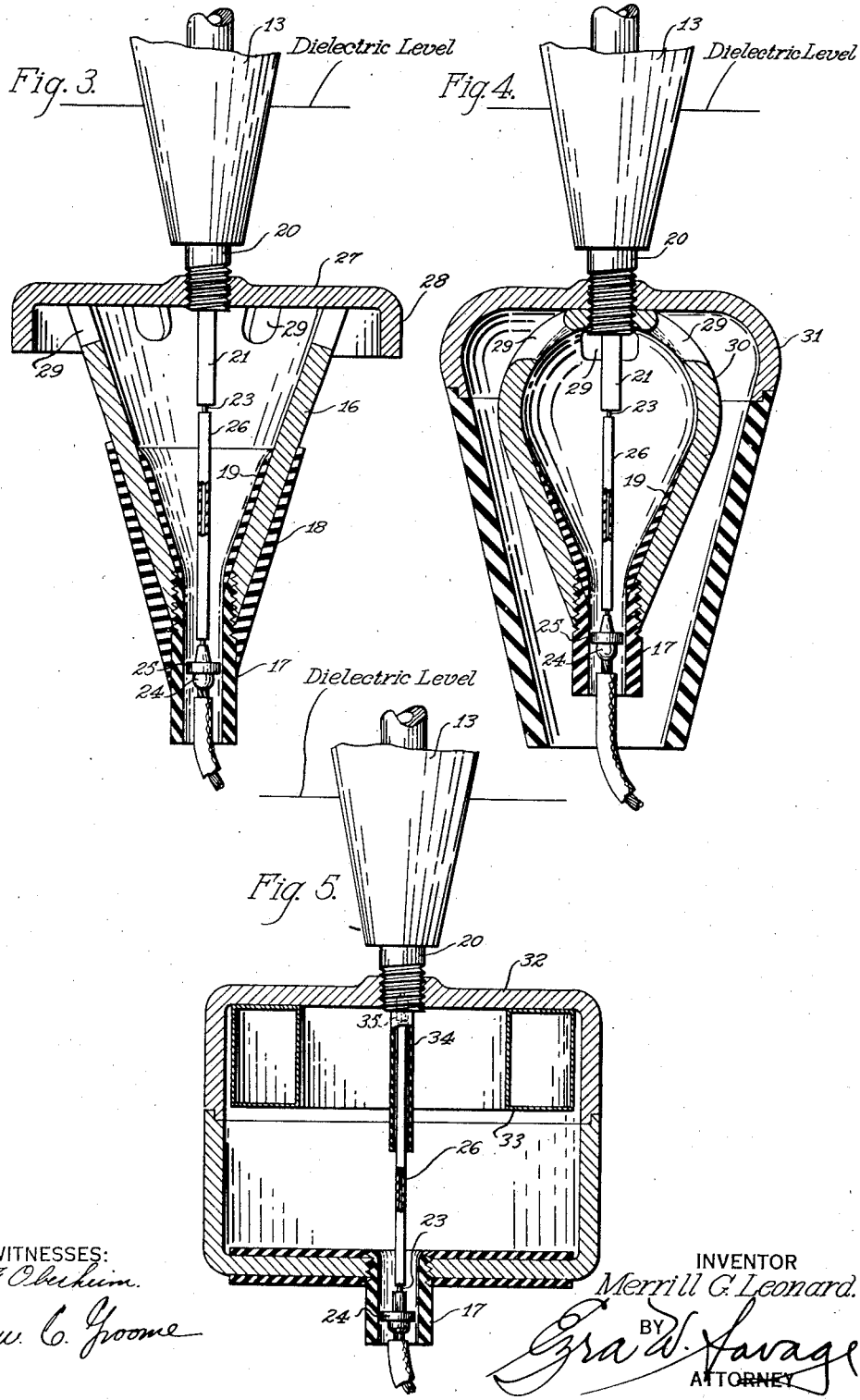

July 15, 1941.   M. G. LEONARD   2,249,012
PROTECTIVE DEVICE FOR ELECTRICAL APPARATUS
Filed Sept. 3, 1938   3 Sheets-Sheet 3
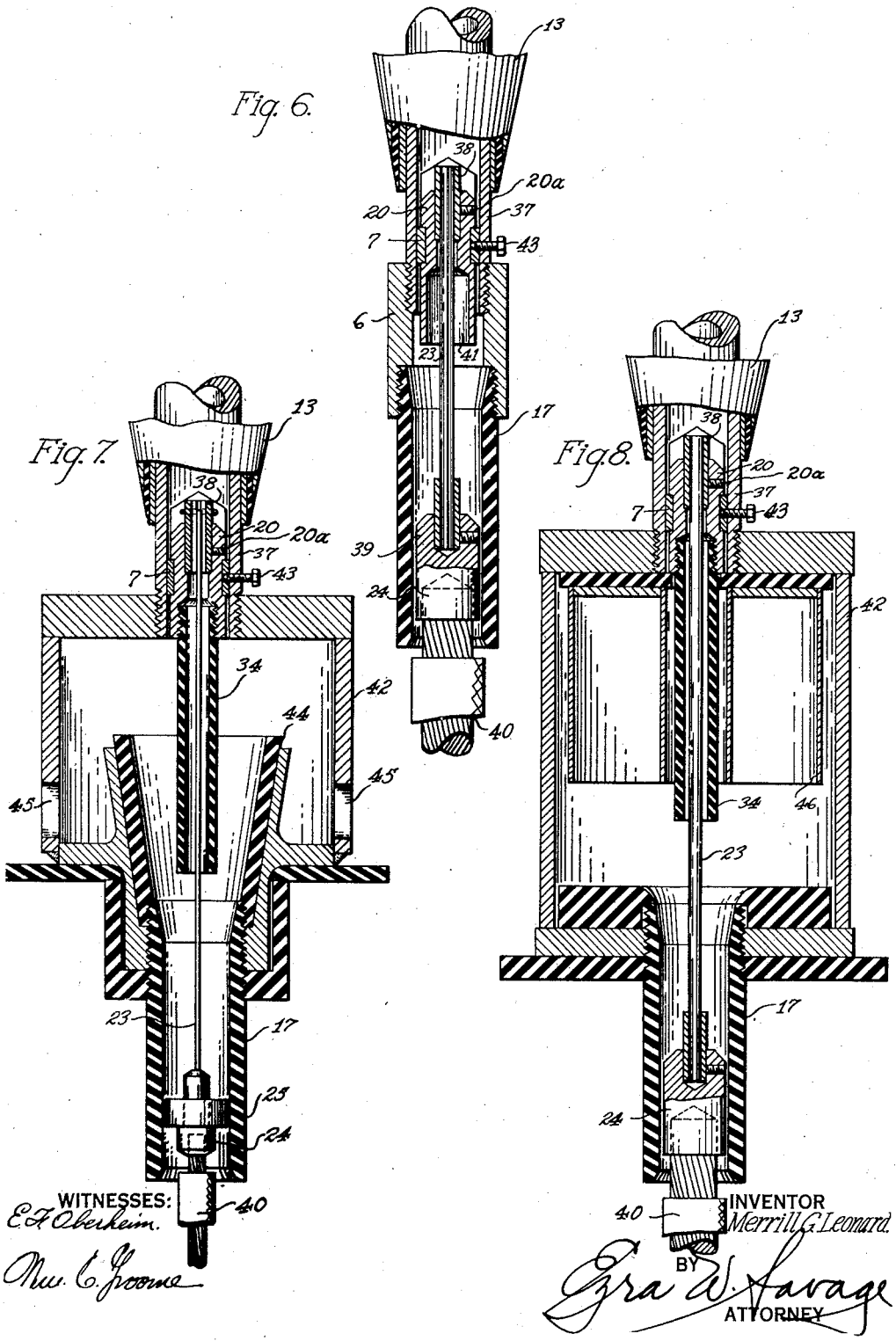

Patented July 15, 1941

2,249,012

UNITED STATES PATENT OFFICE 2,249,012

PROTECTIVE DEVICE FOR ELECTRICAL APPARATUS

Merrill G. Leonard, Sharon, Pa., assignor to Westinghouse Electric & Manufacturing Company, East Pittsburgh, Pa., a corporation of Pennsylvania Application September 3, 1938, Serial No. 228,335

14 Claims. (Cl. 200—120)

The invention relates generally to protective devices for electrical apparatus and, more particularly, to protective devices that function to extinguish electric arcs.

The object of the invention is to provide for interrupting an arc and preventing the restriking of it.

It is also an object of the invention to provide for interrupting arcs carrying large and small currents.

The invention accordingly is disclosed in the embodiment thereof shown in the accompanying drawings and comprises the features of construction, combination of elements and arrangement of parts which will be exemplified in the construction hereinatfer set forth and the scope of the application of which will be indicated in the claims.

For a fuller understanding of the nature and object of the invention, reference should be had to the following detailed description taken in connection with the accompanying drawings, in which Figure 1 is a view in side elevation of a transformer with a portion of the casing cut away, showing a protective device installed for protecting transformer coils.

Fig. 3 is a view in section of a modification of the protective device.

Fig. 4 is a view in vertical section of another modification of the invention showing a double wall structure.

Fig. 5 is a view in vertical section of a modification of the invention showing a double tube structure.

Fig. 6 is a view in vertical section of a modification of the invention showing a double tube construction utilizing a different type of fuse element; and, Figs. 7 and 8 are views in vertical section of modifications of the invention showing two embodiments of the two-tube construction.

Figure 1:
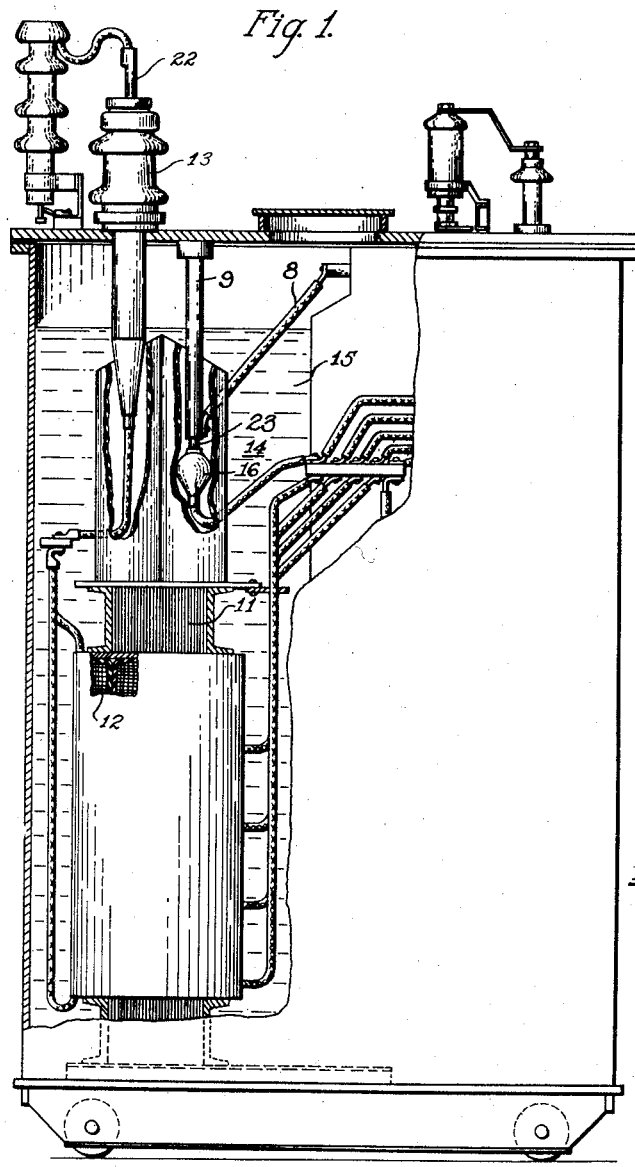

Referring now to the drawings and Fig. 1 in particular, a transformer shown generally at 10 is provided with a core 11 and coils 12. As illustrated, a bushing 13 is mounted in the cover section of the transformer case and depends into the case a predetermined distance. In this showing of the invention, the protective device is suspended from a bushing 9 depending from the cover section. However, the protective device may be supported in any other suitable manner as by suspending it from a bushing such as 13. The general practice is to immerse the protective device 14 either partly or wholly in a dielectric 15 and in Fig. 1, it is shown completely immersed.

Figure 2:
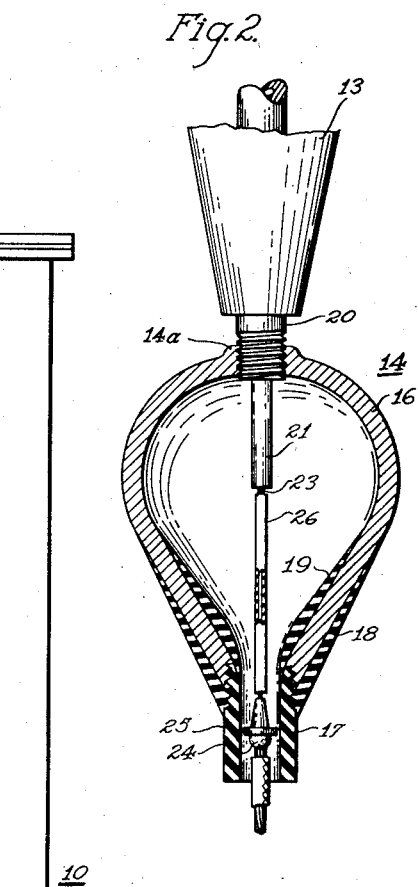
Fig. 2 is a view in cross section of a protective device constructed in accordance with this invention.

In the embodiment of the invention illustrated in Fig. 2, a protective device 14 comprises a steel shell 16 which is shaped to simulate a pear with the small end extending downwardly. The shell may be made from some suitable material having the required strength to withstand the shocks that will be imparted to it as a result of the occurrence of arcs and the generation of gases by the decomposition of dielectrics.

A tube 17, made from fiber or some other suitable material, is threaded as illustrated and mounted in the lower end of the metal shell 16 which is threaded to receive it. In addition to the shell and depending tube 17, insulating members 18 and 19 may be provided. These insulating members may be made from some suitable material, such, for example, as fiber.

The upper end of the shell 16 is provided with a boss as shown at 14a through which an opening extends. The wall defining this opening is threaded internally, as shown. The opening and thread are provided for receiving a threaded tube 20 depending from a bushing or other suitable support.

Extending through the plug 20 is an electrode 21 which is electrically connected with the conductor lead 8 as shown in Fig. 1. A fusible conductor 23 depends from the electrode 21. This conductor may be connected to the electrode in any suitable manner, as by soldering or brazing.

A projectile 24 is electrically connected to the lower end of the fusible conductor 23. This connection may be made in the same manner as the fusible conductor is connected to the plug 21. In order to effectively impose the maximum pressure developed in the shell 16 on the projectile 24, a disc 25 is disposed on the projectile. As shown, this disc is in the nature of a piston of substantially the same cross sectional area as the inside area of the tube 17. It is made slightly smaller in order to facilitate its movement in the tube as a piston moves in the cylinder.

In order to stabilize the performance of the fusible conductor 23, a small fiber tube 26 is mounted on the fusible conductor. This tube cooperates to maintain the cooling effect of the dielectric substantially constant after the fusible conductor has reached a temperature which results in the cracking or vaporization of the dielectric.

In operation, when the current flowing in the fusible conductor 23 reaches a temperature where it effects a fusion of the fusible conductor, gas will be generated by the decomposition of the dielectric. The pressure in the shell 16 will rise very rapidly, and cause considerable turbulence in the dielectric and will force the dielectric along the walls of the pear-shaped shell in the direction of the arc stream. Further, the dielectric flowing outwardly through the tube 17 under pressure will result in a necking action at the mouth of the tube which simulates the necking action seen when liquids flow through an orifice. This cooperates in the interruption of the arc.

The high pressure imposed on the piston or disc 25 will impose a high pressure on the projectile 24, driving it out of the tube, effecting a separation of the fused portions of the fusible conductor 23.

The disc 25 which is usually made of some suitable material such as a composition disc, will flow free of the projectile in the dielectric. The projectile, on the other hand, will be propelled from the tube 17 at a high velocity and because of its streamlining, its deceleration will be small.

In this particular embodiment of the invention, the shell 16 is completely closed at the upper end and when it is immersed in the dielectric, air or other gas will be trapped. If this gas is not absorbed by the dielectric in the process of time, it will result in a cushioning of the shock caused by the fusion of the fusible conductor 23 and the generation of gases.

In the embodiment of the invention illustrated in Fig. 3, the shell 16 is made substantially conical in shape and provided with a flat top 27 having a laterally extending portion carrying a depending flange 28. In order to prevent the building up of excessive pressures, a plurality of openings 29 are provided in the cone-shaped shell 16. These openings are made of the proper size to permit the escape of sufficient dielectric and gases to avoid the building up of an excessive pressure which might result in the rupturing of the shell. This type of shell may be supported in any suitable manner but in the modification illustrated, it is supported in the same manner as the modification shown in Fig. 2, that is, from a plug 20 depending from a bushing 13. The dielectric level should, in both the modification shown in Figs. 2 and 3, be high enough to immerse the fusible conductor 23. The remainder of the structure of the protective device is the same as that shown in Fig. 2. However, in this instance, the insulating members 18 and 19 will be made substantially conical to conform with the shape of the shell 16.

The operation of the protective device shown in Fig. 3 will be much the same as that described for the embodiment illustrated in Fig. 2, the main difference being that the dielectric forced through the openings 29 will be deflected downwardly by the flange 28 along the outer wall of the shell 16 toward the arc stream. In this manner, the turbulence developed by the pressures built up in the shell 16 will cooperate in the interruption of the arc stream.

The modification illustrated in Fig. 4 is somewhat different from that shown in Figs. 2 and 3. In this case, the protected device is a double wall structure. The inner shell, which we will designate 30, is somewhat pear-shaped and is provided with a tube 17 similar to the other modifications. Openings 29 are provided in the inner shell 30 for the escape of dielectric and gases generated during an arcing operation.

The outer shell which we shall designate 31, comprises a metallic base carrying a cone-shaped portion made of some suitable material, such as fiber.

The protective device may be supported in any suitable manner, but is shown as depending from a plug 20 as in the modifications illustrated in Figs. 2 and 3. The size and strength of the shells will depend on the conditions to be met.

In operation, the protective device shown in Fig. 4, will function as described in connection with Figs. 2 and 3, with the exception that the dielectric escaping through the openings 29 will be guided downwardly by the outer shell 31 and discharged in the direction of the arc stream. In this manner, a very effective arc interrupting operation is established.

Many different conditions may occur which will strike and sustain an arc. When the currents are small, it may be desirable to provide additional means to cooperate with the structures described hereinbefore.

In the embodiment of the invention illustrated in Fig. 5, a plurality of tubes are disposed in series in the shell to cooperate in producing a desired arc interrupting operation. As shown, the shell 32 is generally cylindrical in shape, being made in two sections to facilitate the mounting of the collapsible ring-shaped container 33. The shell may be mounted in any suitable manner. For facility in illustration, it is shown mounted in the same manner as the other modifications.

The ring-shaped container 33 is made from some light-weight sheet metal containing air or other gas at any suitable pressure, such as atmospheric. When a severe explosion occurs, this container will collapse and cushion the shock.

The feature of this embodiment of the invention comprises the mounting of a tube 34 in the upper section of the shell 32, as shown. The tube may be mounted in any suitable manner, as by a threaded stud 35 shown in dotted lines. This stud is threaded into the plug 20. The tube may be made of any suitable material, but fiber has been found satisfactory for the purpose.

As illustrated, the tube 34 is disposed in substantial alignment with the tube 17 mounted in the lower end of the shell 32 for the purpose of directing the flow of the dielectric during an arc rupturing operation. Thus we have two tubes in series. The tube 34 is shown as being smaller in diameter than the tube 17. The size of the tubes will depend on the operating conditions to be met.

In operation, when an arc occurs and gases are generated, the two tubes will give two abrupt changes in pressure at different levels, and two necking operations would result from the dielectric flowing out of the tubes. The provision of the second tube 34, which is of small diameter, produces the desired difference in pressure to effect an interruption of the arc even when the currents causing the fusing of the fusible conductor 23 is quite small.

In a case when a large current flows in the arc stream, the small tube may be disrupted but the protective device will still function by reason of the large tube, to effect an arc interrupting operation in the same manner as the other modifications of the invention, which are not provided with the small tube.

It will be evident to anyone skilled in this art that a tube, such as 34, may be provided in any of the other shells, such as illustrated in Figs. 2, 3 and 4. The functioning of the tubes will be the same in every modification.

Tests have shown that with the two-tube structure, the protective device may be utilized successfully for interrupting currents as small as 25 amperes at 66 kv. Thus, it will be seen that a protective device has been provided which will interrupt arcs carrying small currents at high voltages.

The utilization of two or more tube sections operating in series increases the voltage interrupting capacity of the device and enables the use of a single fusible conductor.

In the structure illustrated in Fig. 6, a tube 17 is suspended from the bushing 13 by means of a coupling 36. The coupling may be made of any suitable material, such as iron. As shown, the internal threads of the coupling 36 are engaged with the external threads provided on the lower end of the tube 37, depending from the bushing 13. The fusible conductor 23 is held in a sleeve 38 provided on its upper end and supported in the plug 20 by means of the set screw 20a. This type of structure has been found convenient for manufacturing purposes, but in no wise affects the scope of the invention.

As shown, the fusible conductor 23 employed is relatively large in size and may be made from some high conducting material, such as copper. This type of protective device is, therefore, desired for carrying heavy currents and interrupting arc streams which carry high currents. The projectile 39, depending from the lower end of the fusible conductor 23, is cylindrical in shape and has substantially the same internal diameter as the tube 17. As shown, the projectile is small enough to facilitate its discharge from the tube. The lower end of the projectile is electrically connected to the lead 40. The lower end of the plug 20 is counterbored, as shown at 41, thus presenting a second tube in substantial alignment with the tube 17.

In operation, this modification of the invention will function in much the same manner as that described for the modification illustrated in Fig. 5.

In the modification illustrated in Fig. 7, the shell 42 which is substantially cylindrical in shape is supported on the tube 37. As illustrated, the upper end of the shell is provided with an internally threaded opening for receiving the lower threaded end of the tube. A plug 20, which in this instance is substantially cylindrical, is supported in the tube 37 by means of a set screw 43. This set screw engages in a split ring 7 which seats in a groove in the plug 20.

This type is a two-tube structure somewhat similar to that illustrated in Fig. 5, the upper and smaller tube 34 depending from the plug 20. In mounting the tube 34, the upper end is threaded and engages in a threaded opening provided in the lower end of the plug 20. The lower tube 17 depends from the bottom of the shell 42, as shown, a member 44 simulating the shell of a conic frustum is disposed in the bottom of the shell 42. In this modification of the invention, the member 44 overlaps the tube 34.

In the shell 42, a plurality of openings 45 are provided which will permit the escape of dielectric and gases when an arc interrupting process takes place. The projectile 24 and disc 25 perform the same function in substantially the same way as the projectiles illustrated in the other figures. In this instance, a fusible conductor 23 is provided which will not carry as high currents and is more adapted for effecting the interruption of an arc of higher voltage and low current.

The operation of this device will be much the same as the others with the exception that when a pressure is built up in the shell 42, a greater turbulence will be effected at the lower end of the tube 34 and in the member 44.

In the embodiment of the invention illustrated in Fig. 8, a shell 42 is provided which is the same as that illustrated in Fig. 7, and the plug 20 and fusible conductor 23 are mounted in the same manner. The main difference between the structure shown in Figs. 7 and 8 is that the member 44 is omitted and an inverted container somewhat annular in shape is provided to cushion shocks. In this construction, the tubes 34 and 17 are in substantial alignment and function in the same manner as that described for the modifications illustrated in Figs. 5 and 7. The container 42 may be made of any suitable metallic material capable of withstanding shocks. It may be suspended from the bushing 13 in any suitable manner well known in the art.

Tubes 26 may be supplied on the fusible conductors 23 provided in any of the modifications. Whenever it is used, it will perform the function of stabilizing the cooling effect of the dielectric particularly after the temperature of the fusible conductor has risen to a temperature above the crack or decomposition temperature of the dielectric.

Since certain changes may be made in the above articles and different embodiments of the invention can be made without departing from the scope thereof, it is intended that all matter contained in the above description or shown in the accompanying drawings shall be interpreted as illustrative and not in a limiting sense.

I claim as my invention:

1. A protective device for electrical apparatus provided with a body of dielectric comprising, in combination, a conductor which will fuse when subjected to predetermined electrical conditions, a case for the conductor, the case having an opening therein for receiving the dielectric, the conductor being so disposed in the case that at least a portion of it is immersed in the body of dielectric, and a projectile connected to the one end of the conductor and disposed to be projected through the opening in the case and through the body of the dielectric, the case being so shaped that upon the generation of gases and the development of pressure as a result of the fusing of said fusible conductor, the dielectric in the case is directed toward the arc stream to cooperate in the interrupting of the arc.

2. A protective device for electrical apparatus provided with a body of dielectric comprising, in combination, a conductor which will fuse when subjected to predetermined electrical conditions, a case for the fusible conductor, the case having an opening therein to receive dielectric from the body of dielectric, the case and fusible conductor being so disposed that at least a portion of the fusible conductor is immersed in the dielectric, the case being so shaped that when the dielectric is being forced therefrom upon the development of pressure as a result of the decomposition of the dielectric, the dielectric is directed toward an arc stream that may be caused by the fusing of the fusible conductor to cooperate in extinguishing an arc.

3. A protective device for electrical apparatus comprising, in combination, a conductor which will fuse when subjected to predetermined electrical conditions, a dielectric in which at least a portion of the fusible conductor is immersed, the dielectric being subject to decomposition when exposed to an electric arc, a case having a plurality of openings therein through which the dielectric may flow, the case being provided to house the fusible conductor, the case converging toward one end to direct the dielectric and gases generated toward the arc stream to cooperate in interrupting the arc, means carried by the case associated with the openings for directing the dielectric and gases forced therethrough by the development of pressures toward the arc stream outside of the case as they flow to the body of the dielectric provided with the electrical apparatus to cooperate in the extinguishing of the arc.

4. A protective device for electrical apparatus comprising, in combination, a conductor which will fuse when subjected to predetermined electrical conditions, a dielectric in which at least a portion of the fusible conductor is immersed, the dielectric being subject to decomposition when exposed to an electric arc thereby producing gases, a case provided with a plurality of openings for permitting the flow of the dielectric, the case being provided for housing the fusible conductor and shaped to direct the flow of the dielectric liquid and generated gases toward the arc stream caused by the fusing of the conductor to cooperate in extinguishing the arc, a second case disposed over an opening through which the dielectric may flow cooperative with the inner case for directing the flow of the dielectric and gases after they have flowed out of an inner case toward the arc stream to cooperate in the interruption of the arc.

5. In a protective device for electrical apparatus in combination, a conductor which will fuse when subjected to predetermined electrical conditions, a dielectric in which at least a portion of the fusible conductor is immersed, a case for the fusible conductor, a plurality of tubes open at the end disposed in the case, the tubes being in substantial alignment, the fusible conductor being associated with the tubes whereby when an arc occurs, the tubes cooperate in developing differences of pressure in the dielectric to effect an interruption of the arc.

6. In a protective device for electrical apparatus in combination, a conductor which will fuse when subjected to predetermined electrical conditions, a dielectric in which at least a portion of the fusible conductor is immersed, a plurality of tubes open at the end associated with the fusible conductor and disposed in the dielectric, said tubes being disposed to create differences in pressure in the dielectric to cooperate in the interruption of an arc struck by the fusing of the fusible conductor.

7. A protective device for electrical apparatus comprising in combination, a conductor which will fuse when subjected to predetermined electrical conditions, a dielectric in which at least a portion of the fusible conductor is immersed, the dielectric being subject to decomposition when exposed to an electric arc, a case in which the fusible conductor is disposed, a plurality of tubes in substantial alignment associated with the fusible conductor to effect differences in pressure in the dielectric when an arc occurs to cooperate in the interruption of the arc and means for cushioning the shock resulting from the occurrence of an arc.

8. A protective device for electrical apparatus comprising in combination, a conductor which will fuse when subjected to predetermined electrical conditions, a dielectric in which at least a portion of the fusible conductor is immersed, the dielectric being subject to decomposition when exposed to an electric arc, a tube provided on the fusible conductor to stabilize the rate of rise of temperature, a case for the fusible conductor, a case being provided with openings to facilitate the flow of the dielectric and means for directing the dielectric in the direction of the arc stream and a plurality of tubes cooperating for establishing differences in pressure in the dielectric to effect the interruption of the arc resulting from the fusing of the fusible conductor.

9. A protective device for electrical apparatus comprising, in combination, a conductor which will fuse when subjected to predetermined electrical conditions, a dielectric in which at least a portion of the fusible conductor is immersed, the dielectric being subject to decomposition when exposed to an electric arc, a plurality of open ended tubes associated with the fusible conductor and cooperative to establish differences in pressure in the dielectric when an arc results in the fusing of the fusible conductor and means for effecting a separation of the fused portions of the fusible conductor.

10. A protective device for electrical apparatus comprising, in combination, a conductor which will fuse when subjected to predetermined electrical conditions, a dielectric in which at least a portion of the fusible conductor is immersed, the dielectric being subject to decomposition when exposed to an electric arc, a plurality of tubes associated with the fusible conductor and cooperative to establish differences in pressure in the dielectric when an arc results in the fusing of the fusible conductor, means for effecting a separation of the fused portions of the fusible conductor, and means associated with the tubes and fusible conductor to cushion the shock resulting from the occurrence of an arc.

11. A protective device for electrical apparatus comprising, in combination, a conductor which will fuse when subjected to predetermined electrical conditions, a tube disposed on the fusible conductor to cooperate in predetermining the conditions under which the conductor will fuse, a dielectric liquid in which at least a portion of the fusible conductor is immersed, the dielectric liquid being subject to decomposition when exposed to an electric arc, a plurality of tubes associated with the fusible conductor and cooperative to establish differences in pressures in the dielectric liquid when an arc results in the fusing of the fusible conductor, a projectile cooperative for effecting a separation of the fused portions of the fusible conductor and means associated with the tubes and fusible conductor to cushion the shock resulting from the occurrence of an electric arc.

12. A protective device for electrical apparatus provided with a body of dielectric liquid, comprising in combination, a conductor which will fuse when subjected to predetermined electrical conditions, at least a portion of the fusible conductor being immersed in the dielectric liquid, the dielectric liquid being subject to decomposition when exposed to an electric arc, a plurality of open ended tubes associated with the fusible conductor and cooperative to establish differences in pressures in the dielectric liquid when an arc occurs fusing the fusible conductor, a projectile for effecting a separation of the fused portions of the fusible conductor and an open-ended tubular member in which the gas is trapped, disposed to cooperate to cushion the shock of an arcing operation.

13. A protective device for electrical apparatus provided with a body of dielectric liquid comprising, in combination, a conductor which will fuse when subjected to predetermined electrical conditions, at least a portion of the fusible conductor being immersed in the dielectric liquid, the dielectric liquid being subject to decomposition when exposed to an electric arc, a case for the fusible conductor, the case being open at the lower end, a projectile connected to the lower end of the fusible conductor and disposed to be discharged through the open end of the case into the body of the dielectric liquid, and means containing a compressible medium cooperative to cushion the shock resulting from an arcing operation.

14. A protective device for electrical apparatus provided with a body of dielectric liquid comprising, in combination, a conductor which will fuse when subjected to predetermined electrical conditions, a case having an opening therethrough for containing the fusible conductor, a projectile connected to the fusible conductor and disposed in alignment with the opening in the case, a plurality of open-ended tubes associated with the fusible conductor and cooperative to establish differences in pressures in the dielectric liquid when an arc occurs and fuses the fusible conductor, the projectile serving to effect a separation of the fused portions of the fusible conductor as it is driven through the opening in the case, and means containing a compressible medium associated with the tubes to cushion the shock resulting from the occurrence of an arc.

MERRILL G. LEONARD.